United States Patent [19]
McCafferty et al.

[11] Patent Number: 5,186,327
[45] Date of Patent: Feb. 16, 1993

[54] COMPACT DISC RETAINING SHEET

[76] Inventors: Daniel K. McCafferty, 410 W. 51 St. Apt. 404, New York, 10019; Michael P. McCafferty, both of New York, N.Y.

[21] Appl. No.: 893,435

[22] Filed: Jun. 4, 1992

[51] Int. Cl.⁵ ............................................ B65D 85/57
[52] U.S. Cl. .................................. 206/313; 206/312
[58] Field of Search ................ 206/303, 307, 309–313, 206/444

[56] References Cited

U.S. PATENT DOCUMENTS

| | | | |
|---|---|---|---|
| 4,365,708 | 12/1982 | Tyus | 206/309 |
| 4,635,792 | 1/1987 | Yamada et al. | 206/312 |
| 4,993,552 | 2/1991 | Bugbey et al. | 206/444 |
| 5,090,561 | 2/1992 | Spector | 206/313 |
| 5,135,105 | 8/1992 | Schmeisser | 206/313 |

Primary Examiner—Jimmy G. Foster

[57] ABSTRACT

A compact disc retaining sheet (30) for holding a compact disc. Compact disc retaining sheet (30) is of adequate size to be securely held, inserted and withdrawn from a cardboard cover (44) similar to a standard phonograph cover. Sheet (30) comprises a rear panel (34), a disc support (36), a disc support (38), a central pad (40), a front panel (32). Disc supports (36, 38) and central pad (40) are positioned and bonded to rear panel (34) in order to create the most secure fit for a compact disc. Front panel (32) is bonded over rear panel (34) and disc supports (36, 38). Front panel (32) has a cut-out portion (58) which allows central pad (40), a specific area of rear panel (34) and portions of disc supports (36, 38) to remain visible. This visible part allows a compact disc to be securely fastened between disc supports (36, 38).

9 Claims, 7 Drawing Sheets

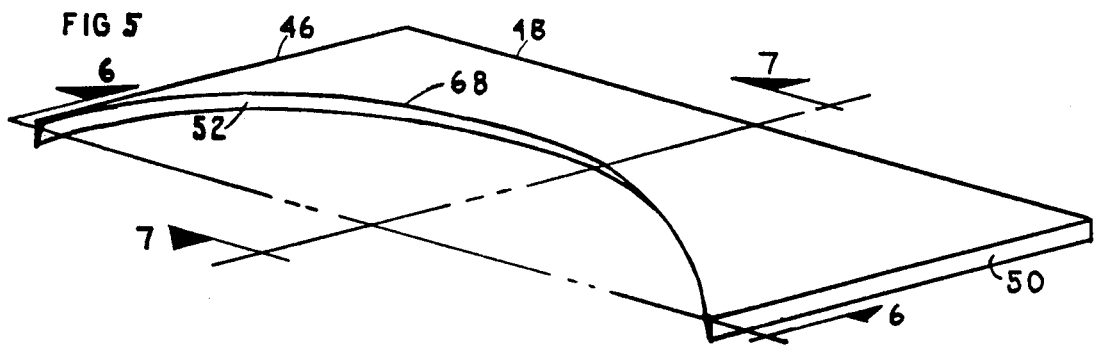
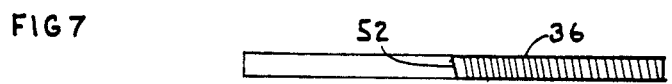
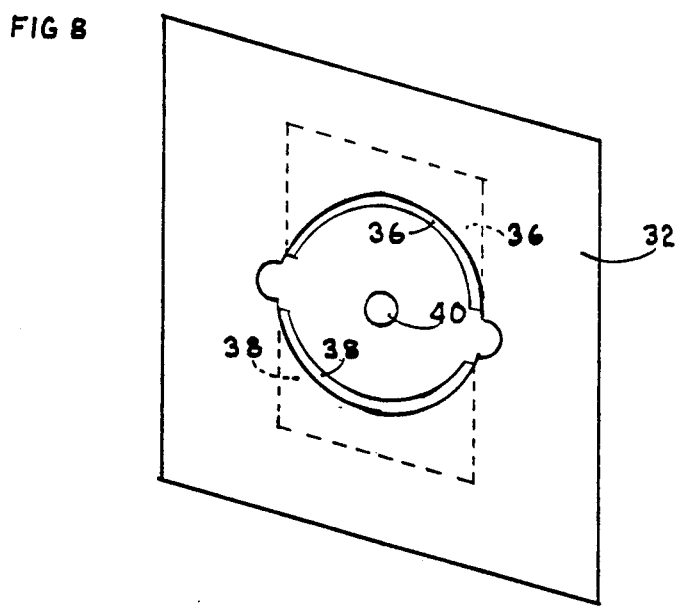

COMPACT DISC RETAINING SHEET

BACKGROUND

1. Field of Invention

This invention relates to compact discs, particularly a novel and unique format in which the disc is effectively housed.

2. Description of Prior Art

In recent years the compact disc has emerged as one of the most popular mediums for the production of music. The containers for storing and merchandising the disc have also emerged as one of the most contested and debated topics in the recording industry.

Presently the most popular container in use is constructed of rigid plastic and incorporates three pieces: a rectangular base, a rectangular cover rotably engaged to the base, and a rectangular disc receptable affixed to the base. Since the container only slightly exceeds the dimensions of a compact disc, typically 110 mm in diameter, the overall size of this combination is relatively small. Due to this size several disadvantages arise: the ease in which such a container can be shoplifted is increased, exterior and interior graphics (lyrics, credits, photos, etc.) are reduced in ratio to the container size so that reading is difficult and pictures are insignificant, additional inserts (posters, booklets, librettos) are proportionately reduced or are not offered at all, and the small size of the container contributes to the difficulty in deciphering the title and artist from any distance other than a few feet. To help combat some of these inadequacies additional packaging was introduced.

A substantial amount of cardboard, approximately twice the size of the disc container (commonly referred to as the longbox), was added to help alleviate some of these disadvantages. The additional packaging, which is completely disposed of once purchased, created another contested and highly debated topic—that of needless waste. So severe is this point that the recording community has proclaimed that this mode of packaging is not "environmentally friendly." When all of this additional packaging is discarded, any graphics that are part of the packaging are also discarded.

Since the disc container is constructed of three separate rigid plastic pieces, including a hinging network, molding dies are required thus adding to the cost of the disc. If the disc container is accidentally dropped, the possibility of breakage is high since it is made of rigid plastic. Moreover, if two or more discs are to be offered then a completely different container must be manufactured and used as the present container can only hold one disc. Creation of a different container for multiple discs further amplifies the aforementioned problems. More cost is involved due to its increased size, the chances of breakage are increased because there are more moving parts, and displaying these larger containers is more difficult for music retailers.

With the introduction of the compact disc in the longbox, music retailers experienced few, if any, problems refitting their racks from those holding L.P.'s to those holding the longbox configuration. Now disc manufacturers are doing away with the longbox and will merely shrinkwrap the jewel box. Retailers are going to have to absorb the huge expenditure to change fixtures to accommodate the new package, plus increase security to prevent more theft—costs consumers will eventually bear.

Other containers exist in today's market besides the jewel box with or without the longbox. The DigiPak, a container made of mostly cardboard, is purchased in an open fashion, and then after purchase is folded down to about the size of a disc. Still another container made of paperboard and plastic, the Eco-Pak, has a drawer where the disc fits, and the container is shrink-wrapped in plastic with the drawer pulled out. After purchase it is relegated to about the size of a disc when the drawer slides closed. These and other versions still suffer from most if not all the disadvantages of the presently popular container: they are all relatively small and made partially or totally of plastic.

Objects and Advantages

Accordingly, it is the purpose of the present invention to remedy the failings of the above-mentioned disc containers. Several objects and advantages of the present invention are:

(a) to provide a disc retaining package that decreases the potential for shoplifting;

(b) to provide a disc retaining package that is adequate in size to enhance the exterior graphics (i.e. titles, pictures, drawings, lettering) to improve marketability;

(c) to provide a disc retaining package that is adequate in size to enhance the interior graphics (i.e. lyrics, photos, credits) to improve marketability;

(d) to provide a disc retaining package that can contain valuable marketing items such as posters, cut-outs, pop-up figures, booklets, librettos, etc., and present them to the public in a size that can be more readily appreciated;

(e) to provide a disc retaining package that can contain more than one of the above-mentioned marketing items;

(f) to provide a disc retaining package that can be viewed, appreciated, and more effectively diaplayed from more than a few feet;

(g) to provide a disc retaining package that has very little, if any, disposable material;

(h) to provide a disc retaining package where molding dies are not required, therefore reducing cost of manufacturing;

(i) to provide a disc retaining package that can hold more than one disc without significant changes in size or shape;

(j) to provide a disc retaining package that negates the need to refixture stores with different storage racks; and (k) to provide a disc retaining package resistant to breakage if dropped.

Further objects and advantages are: to provide a disc retainer and disc retaining package made from totally recyclable material which is easy to use, supplies a safe and secure storage facility for a disc, addresses and remedies the concerns of the recording community, obviates the need for special anti-theft methods, and is aesthetically pleasing to the public. The disc retaining package also introduces opportunities for educational purposes such as easy to read booklets. Still further objects and advantages of the present invention will become apparent from a consideration of the drawings and following description of it.

DRAWING FIGURES

FIG. 5 is a perspective view of a disc support.

FIG. 6 is a horizontal sectional view of a disc support taken on line 6—6 of FIG. 5

FIG. 7 is a horizontal sectional view of a disc support taken on line 7—7 of FIG. 5.

FIG. 8 is a perspective view of front panel, disc supports and central pad.

Figure 1:
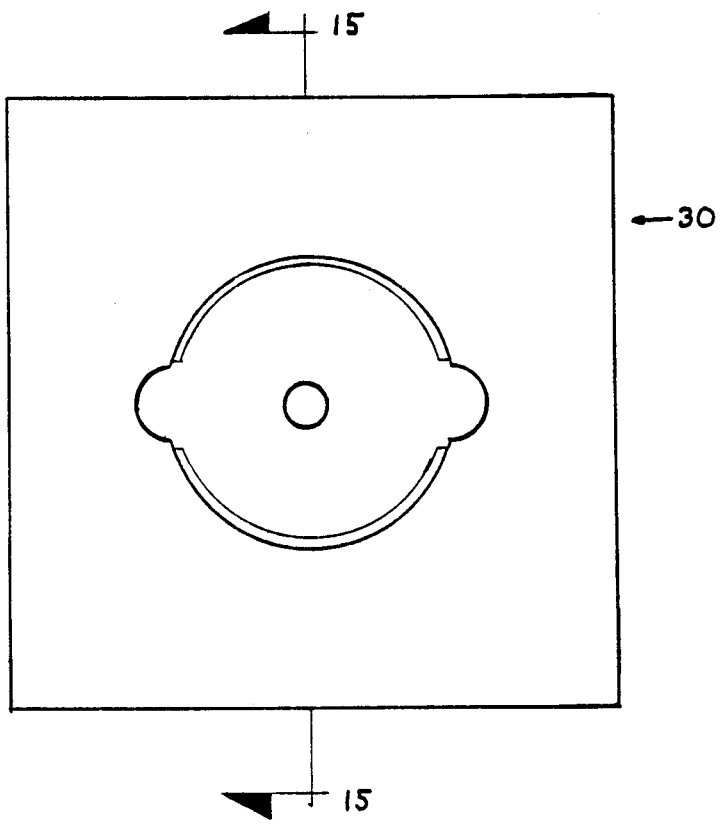
FIG. 1 is a plan view of compact disc retaining sheet.

Reference Numerals in Drawing 30 compact disc retaining sheet
32 front panel
34 rear panel
36 disc support
38 disc support
40 central pad
36A disc support
38A disc support
40A central pad
42 compact disc
44 standard phonograph album cover
46 disc support side
48 disc support side
50 disc support side
52 arc side
54 arc side
56 rear panel border
58 cut out portion
58A cut out portion
60 upper border
62 lower border
64 cut out area
66 cut out area
68 arc edge
70 entrance edge
72 entrance edge
74 groove area
76 compact disc retaining sheet

DESCRIPTION

Figure 2:
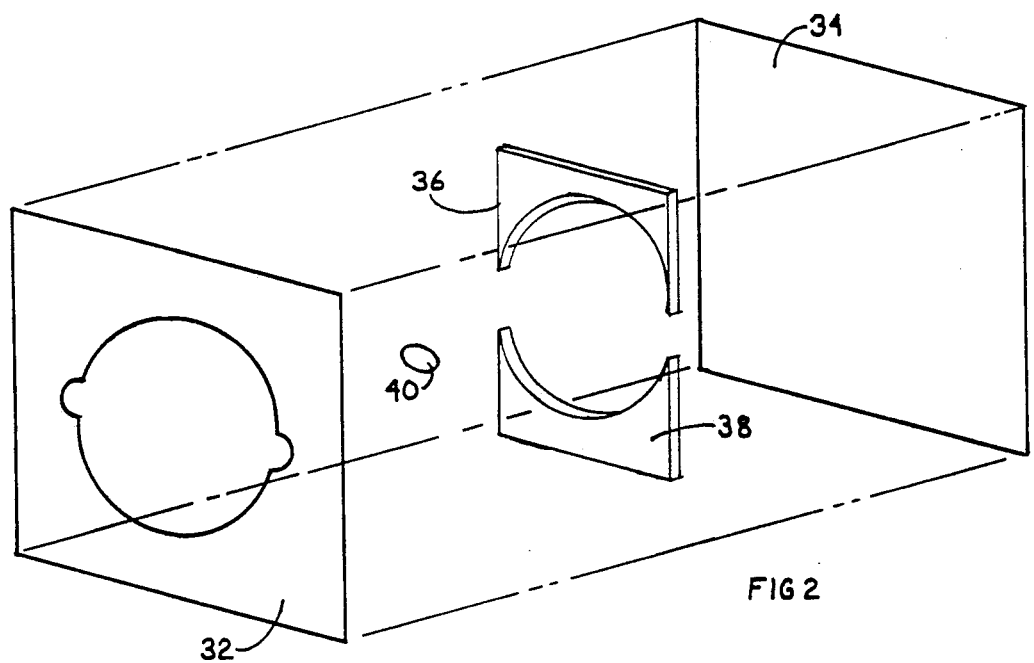
FIG. 2 is an isometric exploded view of compact disc retaining sheet.
Figure 3:
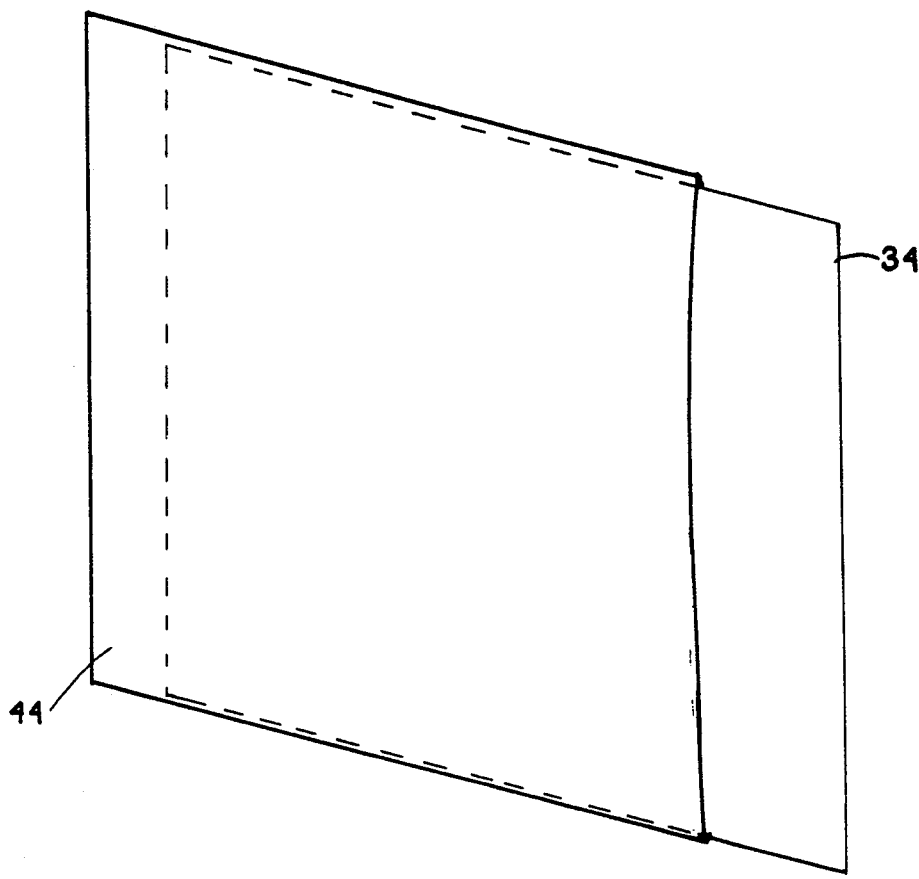
FIG. 3 is a perspective view of rear panel being inserted inside standard phonograph album cover.
Figure 4:
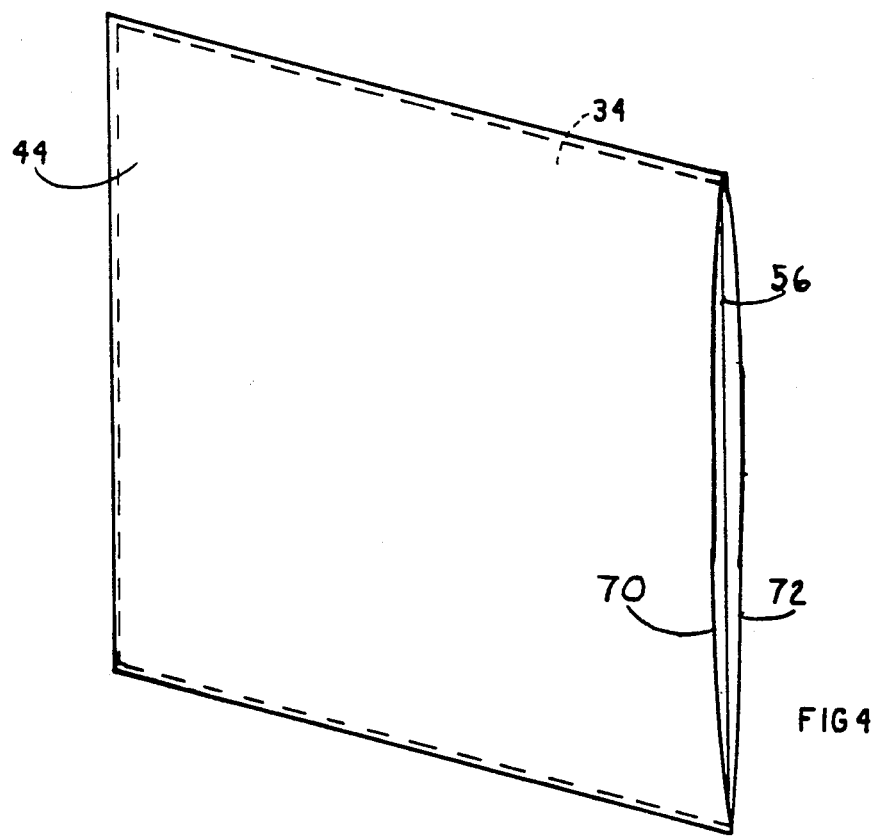
FIG. 4 is a perspective view of rear panel fully enclosed inside cover.

Following is a description of the attached drawings with regard to the preferred embodiment of this invention. FIG. 1 shows a plan view of compact disc retaining sheet 30. The components of sheet 30 can be best appreciated by examination of FIG. 2. FIG. 2 is an isometric exploded view of sheet 30. In FIG. 2 sheet 30 comprises a rear panel 34, a disc support 36, a disc support 38, a central pad 40, and a front panel 32. Rear panel 34 is generally square and constructed from flexible cardboard or other like moderately rigid material. FIG. 3 is a perspective view of rear panel 34 being inserted inside a standard phonograph album cover 44. As shown in FIG. 3 rear panel 34 is only slightly smaller in dimensions than cover 44. Thus enabling rear panel 34 to be easily accomodated by cover 44. FIG. 4 is a perspective view of rear panel 34 and cover 44, with rear panel 34 fully enclosed inside cover 44. Once rear panel 34 is fully enclosed inside cover 44, a rear panel border 56 is recessed just slightly from an entrance edge 70 and an entrance edge 72 of cover 44. In FIG. 2 are disc supports 36, 38. Disc supports 36, 38 are virtually identical in every aspect concerning their physical structure. Therefore I will use only disc support 36 to describe their structure. FIG. 5 shows a perspective view of disc support 36. Disc support 36 is constructed from a sponge-like material or other like resilient material. Disc support 36 is about ¼ of an inch in thickness. Disc support 36 has three straight disc support sides. A disc support side 46, a disc support side 48, a disc support side 50, and an arc side 52. Disc support 38 has an arc side 54 shown in FIG. 11 and FIG. 15. The length of disc support side 48 is slightly greater than the diameter of a compact disc 42. Disc support sides 46, 50 extend from the ends of disc support side 48 in the same direction at a 90 degree angle to disc support side 48. Disc support sides 46, 50 are equal in length to one another and shorter than disc support side 48. Arc side 52 connects with ends of disc support sides 46, 50. Arc side 52 curves in the direction of disc support side 48. The length and shape of arc side 52 is equal to an arc created by disc 42. FIG. 6 is a horizontal sectional view of disc support 36 taken along line 6—6 of FIG. 5 showing the taper of arc side 52. Arc side 52 tapers downwardly and inwardly at about a 45 degree angle. FIG. 7 is a horizontal sectional view of disc support 36 taken along line 7—7 of FIG. 5 again showing taper of arc side 52.

Figure 9:
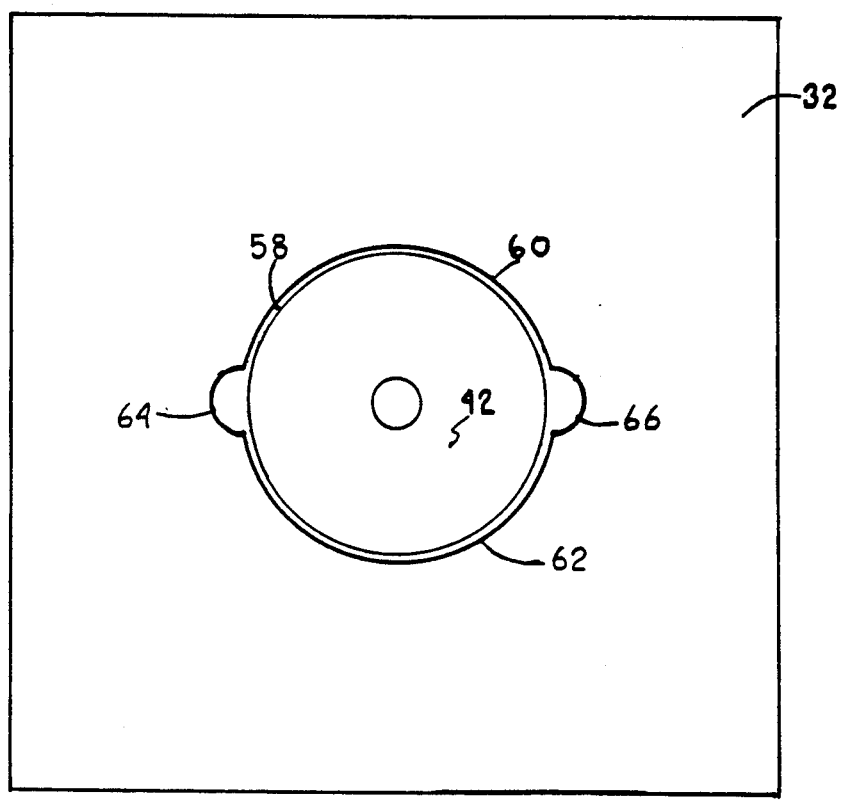
FIG. 9 is a plan view of front panel with a disc situated inside cut out portion.

Sheet 30 also includes a central pad 40. FIG. 8 shows a perspective view of central pad 40, disc supports 36, 38 and front panel 32. Central pad 40 is constructed from a soft felt material. The diameter of central pad 40 does not exceed the diameter of the middle portion of disc 42 which is devoid of recorded signal. Central pad 40 is about ⅛ of an inch in thickness. FIG. 9 shows a plan view of front panel 32, without disc supports 36, 38 or central pad 40 but with disc 42 situated inside a cut-out portion 58.

Front panel 32 is generally square, constructed of paper, flexible cardboard, or other like moderately rigid material. Front panel 32 is precisely equal in dimensions to rear panel 34. Front panel 32 has cut-out portion 58. Cut-out portion 58 is situated arbitrarily on front panel 32, but also so the imaginary center of cut-out portion 58 will lie in register with the center of central pad 40. Cut-out portion 58 is circular in nature, and is slightly larger than disc 42. Cut-out portion 58 has an upper border 60 and a lower border 62. Upper and lower borders 60 and 62 of cut-out portion 58 travel along the circumference of disc 42 about ¼ of an inch away from the edge of disc 42. The length of upper and lower borders 60, 62 are equal to the length of arc side 52 of disc support 36. Upper and lower borders 60, 62 are on opposite sides of the horizontal center line of disc 42.

The halfway points of upper and lower borders 60, 62 are in direct line with the vertical center line of disc 42. Cut-out portion 58 includes a cut-out area 64 and a cut-out area 66.

Figure 10:
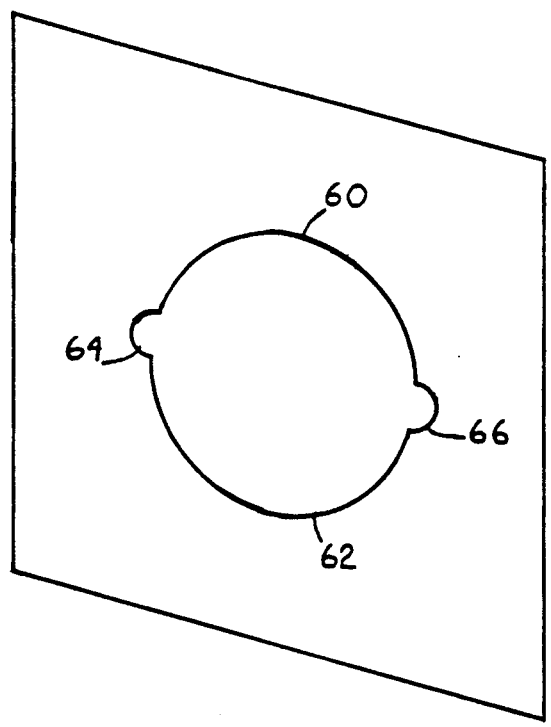
FIG. 10 is a perspective view of front panel.

FIG. 10 is a perspective view of front panel 32. Cut-out areas 64, 66 are identical. Cut-out areas 64, 66 are small half-circle shapes and are equal in size. Cut-out areas 64, 66 are positioned along upper border 60 and lower border 62 opposing each other so the horizontal center line of disc 42 bisects cut-out areas 64, 66 into equal parts. Cut-out area 64 connects with the ends of upper border 60 and lower border 62 on the left side of cut-out portion 58. Cut-out area 66 connects with the ends of upper border 60 and lower border 62 on the right side of cut-out portion 58.

Figure 11:
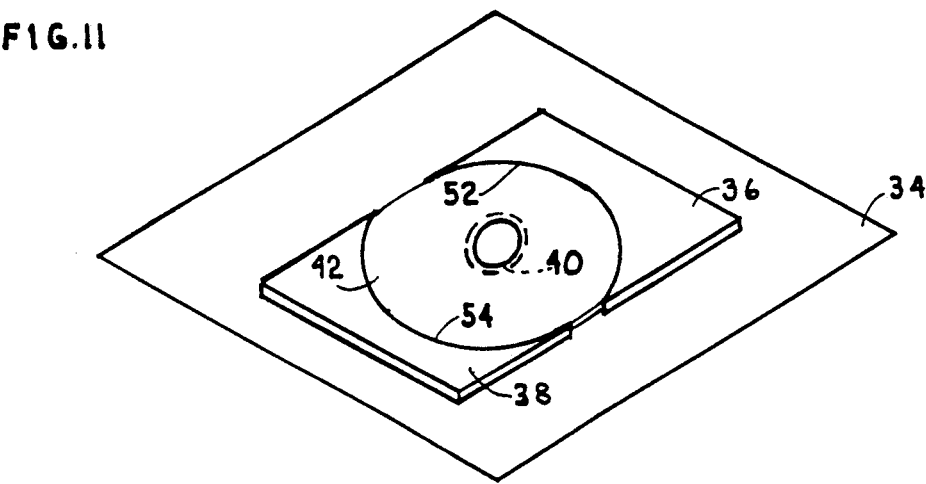
FIG. 11 is a perspective view of rear panel with disc supports and central pad mounted and holding a disc.
Figure 12:
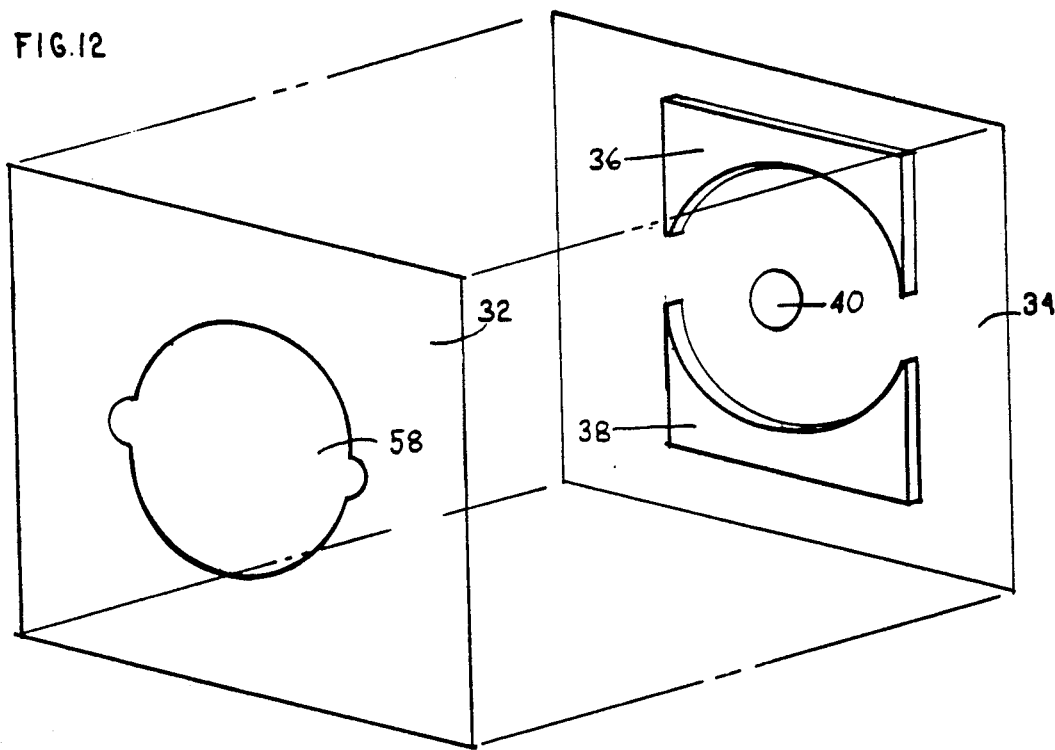
FIG. 12 is an isometric exploded view of front and rear panels with disc supports and central pad mounted on rear panel.
Figure 13:
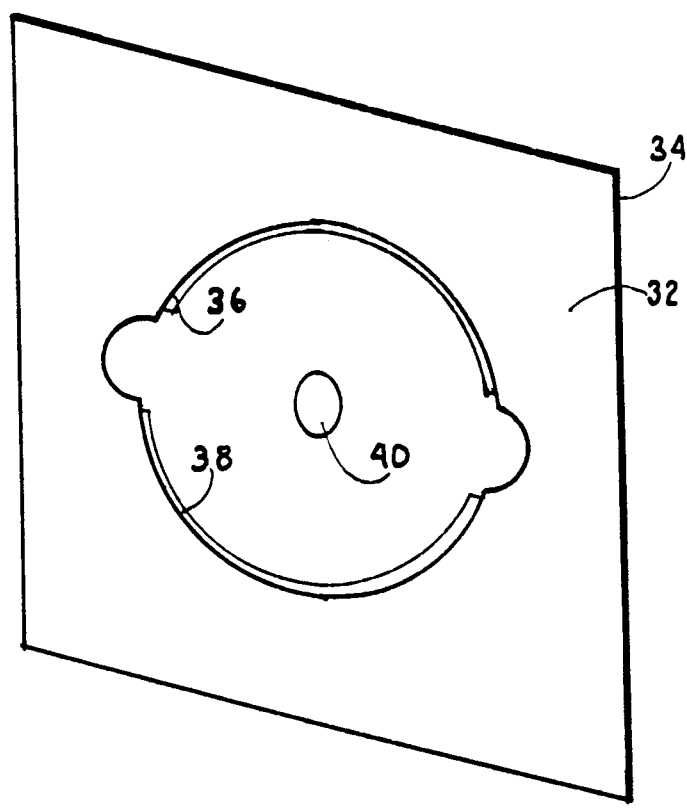
FIG. 13 is a perspective view of compact disc retaining sheet.
Figure 14:
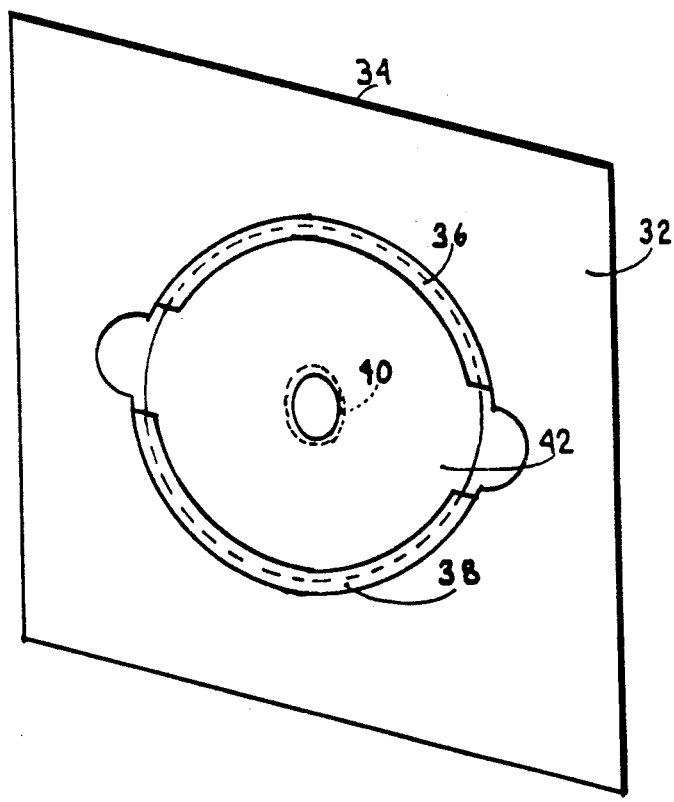
FIG. 14 is a perspective view of compact disc retaining sheet with disc being held.

FIG. 11 is a perspective view of rear panel 34 with disc supports 36, 38 and central pad 40 attached and holding disc 42. Central pad 40 is positioned arbitrarily on rear panel 34 and bonded to rear panel 34 by an adhesive means. Though arbitrarily positioned on rear panel 34 the center of central pad 40 lies in register with the center of disc 42. Disc supports 36, 38 are spaced at opposite sides of the horizontal center line of central pad 40, with arc side 52 and arc side 54 facing central pad 40. Disc supports 36, 38 are spaced relative to the size of disc 42 in order to engage and hold securely disc 42. In addition the halfway point of arc sides 52, 54 are in line with the vertical center line of central pad 40. Disc supports 36, 38 are bonded to rear panel 34 by an adhesive means. FIG. 12 is an isometric exploded view of rear panel 34 with disc supports 36, 38, central pad 40 attached and front panel 32 unattached. FIG. 13 shows a perspective view of a completed compact disc retaining sheet 30 after front panel 32 has been attached. Front panel 32 is bonded over rear panel 34 and disc supports 36, 38 by an adhesive means. Cut-out portion 58 allows central pad 40 an area of rear panel 34 and parts of disc supports 36, 38 to remain visible. This visible portion accommodates disc 42. FIG. 14 is a perspective view of sheet 30 with disc 42 mounted.

Figure 17:
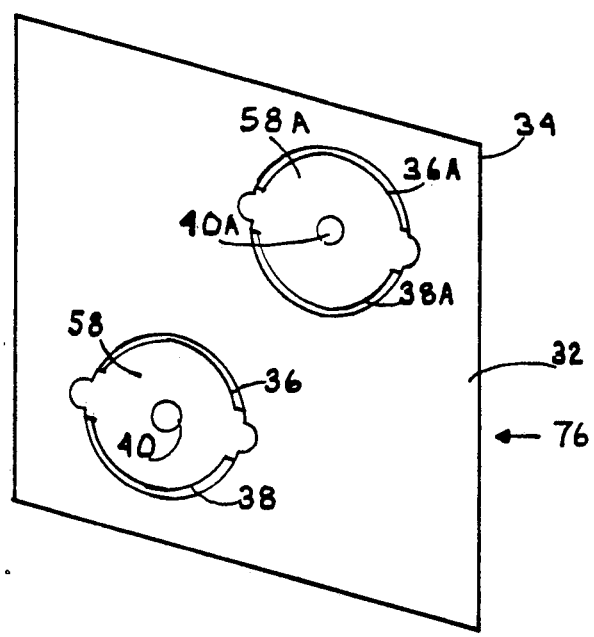
FIG. 17 is a perspective view of second embodiment of disc retaining sheet. This disc retaining sheet is capable of holding two discs.

An additional embodiment is shown in FIG. 17. FIG. 17 is a perspective view of a compact disc retaining sheet 76 capable of holding two discs. In this embodiment disc supports 36, 38, a disc support 36A, a disc support 38A, central pad 40, a central pad 40A, cut-out portion 58, a cut-out portion 58A, rear panel 34 and front panel 32 are used. Disc supports 36A, 38A and central pad 40A are identical in material and structure as disc supports 36, 38 and central pad 40. The placement of disc supports 36A, 38A and central pad 40A on rear panel 34 and cut-out portion 58A on front panel 32 follow the exact guidelines set forth for the placement of disc supports 36, 38, central pad 40 on rear panel 34, and cut-out portion 58 on front panel 32. The placement of disc supports 36A, 38A, central pad 40A and cut-out portion 58A in relation to one another are identical to the relative placement of disc support 36, 38, central pad 40, and cut-out portion 58 to one another. Cut-out portion 58A is of the same design and size as cut-out portion 58.

Operation of Invention

Figure 15:
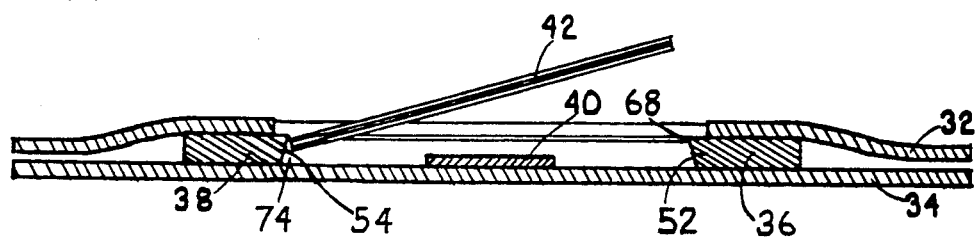
FIG. 15 is a horizontal sectional view taken on line 15—15 of FIG. 1 showing disc being placed in disc supports.
Figure 16:
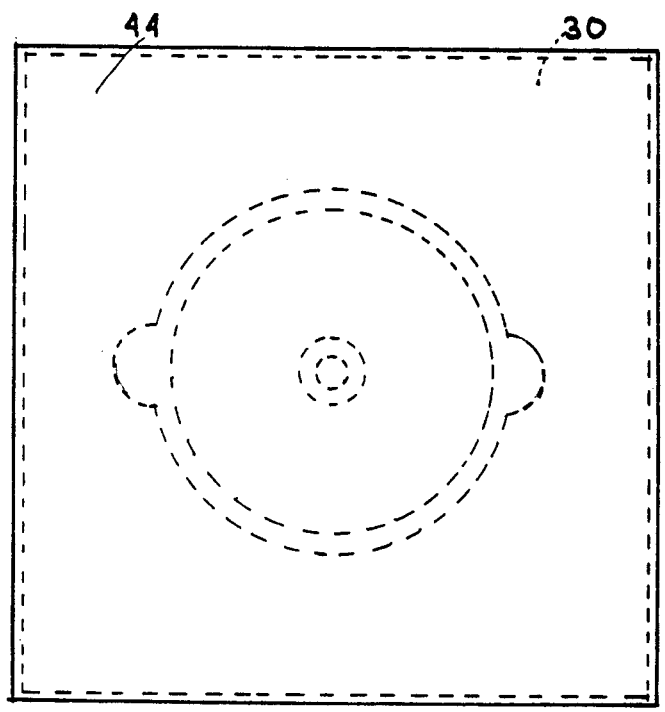
FIG. 16 is a plan view of cover with compact disc retaining sheet fully enclosed.

The method in which compact disc retaining sheet 30 is used is as follows. Sheet 30 may be lying flat or held at an angle for use. FIG. 15 is a horizontal sectional view of sheet 30 taken along line 15—15 of FIG. 1 receiving disc 42. In FIG. 15 a segment of the outer rim of disc 42 is lowered and recessed in a groove area 74 of disc support 38. This outer rim rests against arc side 54 of disc support 38. The remainder of disc 42 is lowered downward toward disc support 36. Disc support 36 has an arc edge 68. As disc 42 is lowered a portion of its unrecessed outer rim will meet arc edge 68 of disc support 36. Since disc support 36 is of a resilient material, arc edge 68 will give as disc 42 continues to be pushed down on it. At this point two functions must be performed simultaneously. While continuing to push disc 42 downward past arc edge 68, pressure is also exerted against arc side 54 by the segment of disc 42 that is recessed in groove area 74. Continue this wedging motion until unrecessed outer rim of disc 42 has passed arc edge 68 and that arc edge 68 has snapped back to its original position and that disc 42 is secured between disc supports 36, 38. The combination of pressure exerted by disc supports 36, 38, and taper of arc sides 52, 54 serve to hold disc 42 secure. After disc 42 is mounted the entire sheet 30 is slipped inside cover 44, as shown in FIG. 16. FIG. 16 is a perspective view of sheet 30 fully enclosed in cover 44.

To remove disc 42 reverse the process of accommodation. Pull out sheet 30 from cover 44. Place thumb and middle finger into cut-out areas 64, 66 and grasp disc 42 by its visible outer rim. Push the outer rim of disc 42, which is recessed in groove area 74 against arc side 54. Maneuver disc 42 out of disc support 36 by pulling outward. Pull the remainder of disc 42 out of disc support 38.

The operation of the second embodiment is identical to the preferred embodiment, but it employs two discs held independent of each other.

Conclusion, Ramifications, and Scope

Thus there is provided in the present invention a unique and novel method to effectively house a compact disc; a method which addresses the failings of the current packages, then remedies them.

The compact disc retaining sheet when housed in a cardboard cover will effectively provide a deterrent to shoplifting, an environmentally "friendly" package, an enhancement to outside cover graphics, an enhancement to inside cover graphics, and a format more readily adept for using promotional items such as posters, pop-ups, cut-out figures, and booklets in singular or multiple combinations. Additionally, because of its size, the compact disc retaining sheet can be displayed easily and can be effectively viewed from more than a few feet. No major refixturing of retail stores is required, no molding dies are needed, it is resistant to breakage if dropped, can secure a disc safely, and is easy to use. In a second embodiment two compact discs can be mounted on the sheet without significant changes in size, shape, or manufacturing cost.

While my above description contains many specifications, this should not be observed as limiting the scope of the invention, but rather providing a presently preferred embodiment. Those skilled in the art will notice modifications are possible without departing from the spirit of the invention. For example, the tapered arc sides of the disc supports could be eliminated and a plastic radial ring could replace the circular pad. The plastic radial ring could secure the disc from its center and disc supports would serve as guards to protect the edge of the disc, but not as actual holders. Computer discs could be stored on the sheet. The overall size of the package could be reduced from that of a standard phonograph album cover to a smaller one—just the front panel could be reduced or the front panel could be eliminated altogether. An envelope-like device could be attached to rear panel and could hold the disc, thus eliminating disc supports, central pad, and front panel. The retaining sheet could be round, triangular, hexagonal, etc., in shape. Retaining sheet itself could be physically connected to a cut-out or pop-up figure making it a part of a promotional item. Thus the scope of the invention should not only be judged by the embodiments illustrated, but by the appended claims and their legal equivalents.

We claim:

1. A compact disc retaining sheet for receiving and storing a compact disc, comprising:
    (a) a rear panel of moderately rigid material in size to be accommodated by a phonograph album cover;
    (b) a central pad with a diameter less than that of said disc, situated on said rear panel and affixed by an adhesive to said rear panel;
    (c) a number of disc supports, said disc supports being of resilient material, having a long side slightly exceeding diameter of said disc, with two equal shorter sides extending from ends of said long side travelling in the same direction at 90 degree angles to said long side and one arc side connecting with ends of said shorter sides, said arc side curving towards said long side, said arc side designed to accommodate slightly less than one half the circumference of outer edge of said disc;
    (d) a front panel of moderately rigid material in size to be accommodated by said standard phonograph album cover, said front panel is affixed by said adhesive over said rear panel and parts of said disc supports, said front panel having a cut-out portion circular in nature and slightly larger than said disc.

2. The compact disc retaining sheet of claim 1 wherein center of said central pad lies in register with center of said disc.

3. The compact disc retaining sheet of claim 1 wherein said disc supports are positioned on opposite sides of an imaginary horizontal centerline of said central pad with said arc sides facing said central pad, spaced in order to engage and securely hold said outer edge of said disc and are affixed by said adhesive to said rear panel.

4. The compact disc retaining sheet of claim 1 wherein said arc side is angled rearwardly at less than a 90° angle with respect to a front surface of each disc support.

5. The compact disc retaining sheet of claim 1 wherein said cut-out portion is positioned so the imaginary center of said cut-out portion lies in register with said center of said central pad.

6. The compact disc retaining sheet of claim 1 wherein said cut-out portion has an upper border and a lower border equal in length to said arc side, travelling along the same line as said arc side and slightly recessed from said arc side.

7. The compact disc retaining sheet of claim 1 wherein said cut-out portion has two equally sized cut-out areas extending outwardly from an upper border and a lower border, opposing each other so that an imaginary horizontal centerline of said central pad bisects said cut-out areas into equal parts.

8. The compact disc retaining sheet of claim 7 wherein said cut-out areas connect said upper border with said lower border.

9. The compact disc retaining sheet of claim 7 wherein said cut-out areas are of a size to allow removal of said disc with fingers.

* * * * *